United States Patent [19]

Walton et al.

[11] 4,438,662

[45] Mar. 27, 1984

[54] AUTOMATIC CONTROL SYSTEM HAVING MANUAL CONTROL ENGAGEABLE AT WILL

[76] Inventors: Eric K. Walton, 1516 Doone Rd., Columbus, Ohio 43221; Gary W. Harris, 5120 Thompson La., Delaware, Ohio 43015

[21] Appl. No.: 250,356

[22] Filed: Apr. 2, 1981

[51] Int. Cl.³ .................... F16H 25/20; F15B 5/00
[52] U.S. Cl. ................... 74/625; 74/424.8 VA; 310/80; 137/85
[58] Field of Search ........... 74/625, 89.15, 424.8 VA; 310/80, 83

[56] References Cited

U.S. PATENT DOCUMENTS

| | | | |
|---|---|---|---|
| 2,452,428 | 10/1948 | Bryant | 74/424.8 VA |
| 2,470,470 | 5/1949 | Carbon | 74/424.8 VA |
| 2,590,745 | 3/1952 | Wüensch | 74/625 |
| 2,660,072 | 11/1953 | Veenschoten | 74/625 |
| 3,278,774 | 10/1966 | Roller et al. | 310/80 |
| 3,482,588 | 12/1969 | Krueter | 137/85 |
| 3,793,896 | 2/1974 | Price et al. | 74/89.15 |
| 4,360,752 | 11/1982 | Morgan | 310/80 |

Primary Examiner—Lawrence J. Staab
Assistant Examiner—Anthony W. Raskob
Attorney, Agent, or Firm—John L. Gray

[57] ABSTRACT

Control system which may be manually operable without disengaging, automatically or otherwise, the automatic features of the control system.

10 Claims, 2 Drawing Figures

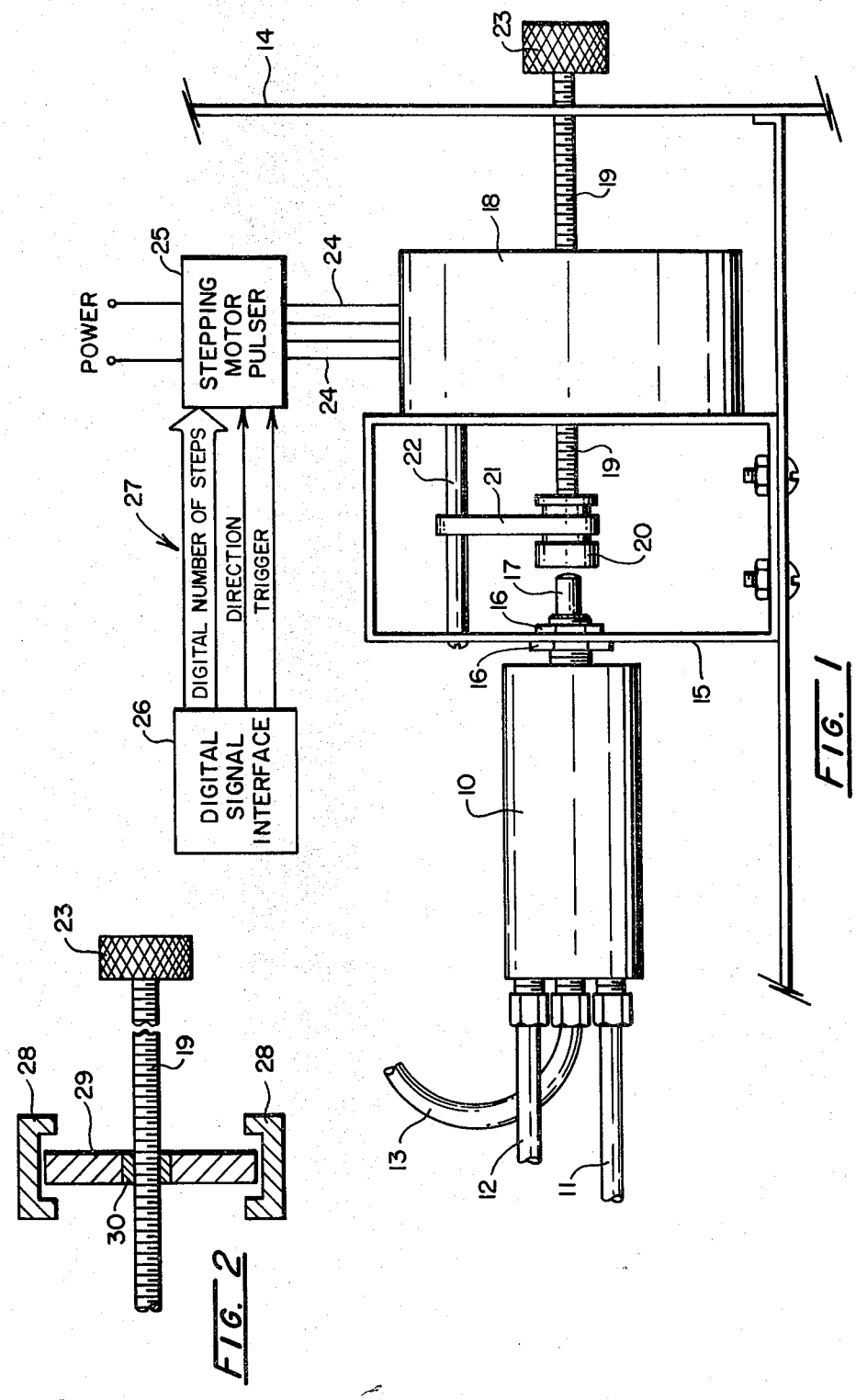

AUTOMATIC CONTROL SYSTEM HAVING MANUAL CONTROL ENGAGEABLE AT WILL

BACKGROUND OF THE INVENTION

Various industrial processes involving automatic control have such control activated from a remote location. For example, it is convenient in many industrial applications to have the control centered at a control center where an operator can monitor information with respect to the industrial process and even though the control system is automatically operated, the operator has the option to shift over to manual control if the situation is warranted. A variety of energy sources are used to operate the ultimate component being controlled. These can be pneumatic, hydraulic, or electrical and a variety of components can be controlled such as valves, electrical resistance, etc. While there is a broad range of industrial application which may be controlled, for illustration purposes herein the manual control option, which is the subject matter of this invention, will be described in connection with a pneumatic pressure regulator which in turn adjusts a pressure operated valve. Such systems are particularly useful in the chemical industry because of their reliability, economy, ruggedness, and safety.

SUMMARY OF THE INVENTION

For illustration purposes only, the invention will be described in connection with the modulation of a valve which is operated as a result of changes in pressure controlled by a pressure regulator which is operated by the automatic control system involved. The manual override of this invention may be actuated at any time and does not require that there be a failure of the automatic control system, such as a failure of the electrical system which automatically controls the pressure regulator.

Furthermore, in the system herein described, it is not necessary for the automatic aspects of the system to be disengaged, either manually or automatically, in order for the operator to seize manual control of the system. Devices of the prior art that are deemed to be most pertinent to this invention are U.S. Pat. No. 3,842,690, Gulick, and U.S. Pat. No. 2,698,157, Ludeman. In each of these patents, however, in order for manual operation to occur, the system must cease to function automatically causing an automatic changeover to permit manual operation of the control system.

Furthermore, in the preferred embodiment of this invention, the pressure regulator setting is altered in incremental amounts so that there is a very low probability of a large output variation due to erroneous signals. The reason for this is because only a small output change occurs with each input triggered command.

It is, therefore, an object of this invention to provide a control system which may be manually operable without disengaging the automatic features of the control system.

It is a further object of this invention to provide such a system which is economical, reliable and simple to construct.

It is a still further object of this invention to provide such a system wherein the instructions to the element being controlled are provided in incremental commands.

This, together with other objects and advantages of the invention, should become apparent in the details of the invention as more fully described in the drawings and specification hereinafter and as claimed herein.

BRIEF DESCRIPTION OF THE DRAWING

FIG. 1 is a side elevation view of the pressure control system showing the manual override.

FIG. 2 is a section on lines 2—2 through the linear stepping motor shown in FIG. 1.

DETAILED DESCRIPTION OF THE INVENTION

Referring now to FIG. 1, there is shown a plunger-type pressure regulator at 10 which is connected to an air supply through tube 11 which air supply is usually from 50 to 100 psi and which is also connected through tube 12 to the valve being controlled. A third hose 13 leads to a gauge (not shown) displayed on the instrument panel 14. The plunger-type pressure regulator 10 is fastened to housing 15 by means of nuts 16—16 permitting plunger 17 to extend out into the housing. Attached to the housing 15 on the opposite side is linear stepping motor 18, the details of which are shown in FIG. 2. The linear stepping motor 18 contains a rotating threaded bearing 30 in which is positioned threaded shaft 19. The end of shaft 19 is provided with a bearing 20 which can contact plunger 17 as the shaft 19 is moved laterally. The shaft 19 is prevented from rotating by means of friction-arm 21 which slides on rod 22, and thus functions to couple the pressure regulator 10, which automatically controls the item being controlled (such as a valve), with the external power supply which, in this case, is the linear stepping motor 18. The end of shaft 19 which extends through the control panel 14 has a knob 23 thereon for manual operation. The linear stepping motor 18 is connected through appropriate wiring 24—24 to a stepping motor pulser 25 which is controlled by a digital signal interface 26 which signals both the number of steps that the stepping motor 18 should take as well as the direction of rotation of the stepping motor 18 as shown diagramatically at 27. The use of a linear stepping motor and stepping motor pulser provides a low probability of large output variations due to erroneous signals.

Referring now more particularly to FIG. 2, which is a section through the linear stepping motor 18, it will be seen that the motor is provided with field coils 28—28 and a rotating armature 29 which is provided with a threaded bearing 30 which functions as a rotatable complementary threaded member and engages the threaded shaft 19.

In operation, the appropriate signal from the digital signal interface 26 as to the number of steps and the direction of rotation of the stepping motor 18 is conveyed to the stepping motor pulser 25 which in turn activates the linear stepping motor 18 causing the armature 29 to rotate in the proper direction and the proper distance. Rotation of this armature 29 causes shaft 19 to move laterally toward or away from the plunger-type pressure regulator 10 thus adjusting the pressure at the output of the pressure regulator 10 and causing the valve being controlled to be actuated. The friction arm 21 prevents the shaft 19 from rotating and as the shaft moves in and out the friction arm 21 slides laterally on rod 22. In the event of a power failure or if, for any reason, manual control is to be exercised, the operator merely rotates the knob 23 which causes the shaft 19 which is threaded in the bearing 30 of the armature 29 to advance or retreat, depending upon the direction of rotation of shaft 19. The frictional force exerted by friction arm 21 on bearing 20 is overcome by manual operation and this causes plunger 17 to move in or move out, depending upon the direction of rotation of shaft 19.

Thus it will be seen that the automatic system can be overridden at any time through manual control and in the event of a failure of the automatic system, manual control can be instantaneously exercised without the necessity of any sort of automatic or manual disengagement being required.

While this invention has been described in its preferred embodiment, it is appreciated that variations therefrom may be made without departing from the true scope and spirit of the invention.

What is claimed is:

1. In a device for exercising control over a further member, which further member may be remotely located from said device, wherein said device includes an external power supply for exercising said control, the combination of a linear stepping motor and a remotely adjustable pulser for directing the exercise of said control, a coupling means between said linear stepping motor and said external power supply which is laterally movable and retained from rotational movement by sliding friction means, and a manually operated means which is capable of overcoming the friction forces of said sliding friction means restraining said coupling means and thus directing the exercise of control.

2. The device of claim 1 wherein said coupling means includes a threaded shaft threaded throughout its length.

3. The device of claim 2 wherein said threaded shaft is threadedly connected to a single rotatable complementary threaded member.

4. The device of claim 3 wherein said complementary threaded member is positioned inside the armature of an electric motor.

5. The device of claim 2 wherein said threaded shaft is restrained from rotational movement by a friction arm.

6. The device of claim 5 wherein said friction arm slides on a rod.

7. The device of claim 1 wherein said device for controlling a further member includes a pressure regulator.

8. The device of claim 7 wherein said pressure regulator is actuated by axial movement of a threaded shaft.

9. The device of claim 4 wherein said device for controlling a further member includes a pressure regulator and said threaded shaft moves axially to actuate said pressure regulator.

10. The device of claim 1 wherein said linear stepping motor and said remotely adjustable pulsar for directing the exercise of said control only directs the exercise of said control in adjustable groups of incremental steps.

* * * * *

UNITED STATES PATENT AND TRADEMARK OFFICE
CERTIFICATE OF CORRECTION

PATENT NO. : 4,438,662
DATED : March 27, 1984
INVENTOR(S) : Eric K. Walton and Gary W. Harris It is certified that error appears in the above-identified patent and that said Letters Patent are hereby corrected as shown below:

In the title of the invention, change the spelling of the word "engageable" to omit the letter "e."

Signed and Sealed this

*Eleventh* Day of *December 1984*

[SEAL]

*Attest:*

GERALD J. MOSSINGHOFF

*Attesting Officer*  *Commissioner of Patents and Trademarks*